United States Patent
Pan et al.

(10) Patent No.: US 7,869,160 B1
(45) Date of Patent: Jan. 11, 2011

(54) PERPENDICULAR RECORDING HEAD WITH SHAPED POLE SURFACES FOR HIGHER LINEAR DATA DENSITIES

(75) Inventors: Tao Pan, San Jose, CA (US); Kroum S. Stoev, Pleasanton, CA (US); Yugang Wang, Milpitas, CA (US); Jack M. Chue, Los Altos, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1125 days.

(21) Appl. No.: 11/116,658

(22) Filed: Apr. 27, 2005

(51) Int. Cl.
*G11B 5/23* (2006.01)
*G11B 5/187* (2006.01)
*G11B 5/31* (2006.01)
*G11B 5/39* (2006.01)

(52) U.S. Cl. ............. 360/119.02; 360/122; 360/125.03; 360/125.3

(58) Field of Classification Search ............ 360/125.01, 360/125.02, 125.03, 125.16, 125.19, 125.22, 360/125.3, 119.02, 119.03, 119.04, 122, 360/123.02, 123.03, 123.04, 123.05, 123.06, 360/123.07, 123.08, 123.09, 123.1, 123.11, 360/123.12
See application file for complete search history.

(56) References Cited

U.S. PATENT DOCUMENTS

| | | | | |
|---|---|---|---|---|
| 4,672,493 A * | 6/1987 | Schewe | ................ | 360/123.11 |
| 4,769,898 A * | 9/1988 | Ono et al. | ................ | 29/603.13 |
| RE33,949 E * | 6/1992 | Mallary et al. | ............... | 360/110 |
| 5,270,291 A * | 12/1993 | Sun et al. | ..................... | 505/211 |
| 5,363,794 A * | 11/1994 | Lairson et al. | ................ | 117/7 |
| 5,495,379 A * | 2/1996 | McNeil et al. | ......... | 360/125.13 |
| 5,603,766 A * | 2/1997 | Visokay et al. | .............. | 117/105 |
| 5,686,193 A * | 11/1997 | Westwood | .................. | 428/611 |
| 5,801,910 A * | 9/1998 | Mallary | ................. | 360/125.65 |
| 5,822,153 A * | 10/1998 | Lairson et al. | ........... | 360/234.7 |
| 5,834,085 A * | 11/1998 | Lairson et al. | ........... | 428/828.1 |
| 5,909,340 A * | 6/1999 | Lairson et al. | ........... | 360/237.1 |
| 5,973,891 A * | 10/1999 | Neumann | .............. | 360/125.54 |
| 6,560,076 B1 * | 5/2003 | Yazawa et al. | .............. | 360/317 |
| 6,707,642 B1 * | 3/2004 | Batra | .................... | 360/125.53 |
| 6,950,277 B1 * | 9/2005 | Nguy et al. | ............ | 360/125.14 |
| 7,196,870 B2 * | 3/2007 | Dugas | ........................ | 360/122 |
| 7,196,871 B2 * | 3/2007 | Hsu et al. | .............. | 360/125.03 |
| 2004/0156142 A1 | 8/2004 | Mochizuki et al. | | |
| 2005/0219764 A1 * | 10/2005 | Kameda et al. | ............. | 360/313 |

* cited by examiner

Primary Examiner—Craig A. Renner

(57) ABSTRACT

A perpendicular recording head is provided having a bottom pole, a writer pole disposed above the bottom pole, and a top shield disposed above the writer pole. The bottom pole and the top shield are both magnetically coupled to the writer pole. The writer pole includes a concave facing surface that faces the top shield. The top shield can include a convex surface that faces the writer pole. The top shield can also include a pedestal that protrudes towards the writer pole.

16 Claims, 14 Drawing Sheets

PERPENDICULAR RECORDING HEAD WITH SHAPED POLE SURFACES FOR HIGHER LINEAR DATA DENSITIES

FIELD OF THE INVENTION

The present invention relates generally to the field of magnetic recording and more particularly to magnetic heads for perpendicular recording.

BACKGROUND

Perpendicular magnetic recording is a recording technique in which magnetic data bits on a magnetic recording disk are defined such that their magnetic moments are perpendicular to the plane of the magnetic recording disk, as opposed to in the plane of the disk as occurs with longitudinal magnetic recording. The switch to perpendicular recording from longitudinal recording is seen as one of the advances that will allow the continued increase in data densities on magnetic recording disks in the coming years.

FIG. 1 shows a cross-sectional view of a perpendicular recording system 100 according to the prior art. The perpendicular recording system 100 includes a magnetic recording disk 110 and a perpendicular recording head 120. The magnetic recording disk 110 includes two layers, a recording layer 130 and a soft magnetic layer 140 disposed beneath the recording layer 130. The perpendicular recording head 120 includes a main pole 150 and a secondary pole 160 magnetically coupled together. Both the main pole 150 and the secondary pole 160 are exposed at an air bearing surface (ABS) that faces the magnetic recording disk 110. The perpendicular recording head 120 also includes coil windings 170 disposed between the main pole 150 and the secondary pole 160.

When an electric current is passed through the coil windings 170, a magnetic field is induced in the main pole 150 and the secondary pole 160. Lines of magnetic flux 180 from the magnetic field extend between the exposed surfaces of the main pole 150 and the secondary pole 160 to complete the magnetic loop around the coil windings 170. The flux lines 180 extend through the recording layer 130 and into the soft magnetic layer 140 where they curve around to return back through the recording layer 130. The main pole 150 and the secondary pole 160 are configured such that the flux lines 180 are densely constrained at the exposed surface of the main pole 150 so that the density of the flux lines 180 are sufficient to define a magnetic bit 190 in the recording layer 130 where the flux lines 180 pass through the recording layer 130 beneath the main pole 150.

FIG. 2 shows a top view of a portion of the magnetic recording disk 110 after a series of magnetic bits 190 have been written. One problem with perpendicular recording is a tendency for the transitions 200 between successive bits 190 to be curved. This curvature occurs because of the shape of the magnetic field beneath the main pole 150. Although the main pole 150 defines a rectangle where exposed at the ABS, the magnetic field beneath the main pole 150 rapidly looses the rectangular shape as the flux lines 180 repel one another. Accordingly, the magnetic field takes on a shape of a rectangle with rounded sides where the magnetic field intersects the magnetic recording disk 110. The rounding of a trailing side of the magnetic field causes the transitions 200 to be correspondingly rounded.

It will be appreciated that, from the perspective of a magnetic reading element reading the magnetic bits 190, the curvature of the transitions 200 makes the time necessary to read each transition 200 longer than would be necessary to read a hypothetical straight transition. And, as the size of the individual magnetic bits 190 decreases, with increasing linear data density, the transitions 200 become a substantial portion of the length of each magnetic bit 190. If the size of the magnetic bits 190 is reduced far enough, the transitions 200 begin to overlap and the reading element can no longer distinguish one transition 200 from the next. Thus, curved transitions 200 limit linear data densities.

Hence, there is a need for a perpendicular recording head that is capable of writing magnetic bits with straighter transitions in order to achieve higher linear densities.

SUMMARY

An exemplary embodiment of the present invention provides perpendicular recording head comprising a writer pole and a top shield disposed above the writer pole and magnetically coupled to the writer pole. Exemplary embodiments of the perpendicular recording head of the present invention can further comprise an optional bottom pole disposed below the writer pole and also magnetically coupled thereto. The writer pole includes a facing surface that is proximate to, and faces, the top shield. The facing surface is concave as viewed from the perspective of the top shield. In some embodiments the top shield includes a convex surface that is proximate to, and faces, the writer pole. The convex surface is convex as viewed from the perspective of the writer pole. Also in some embodiments the top shield includes a pedestal that protrudes towards the writer pole and is separated therefrom by a gap layer. In these embodiments a bottom surface of the pedestal can include the convex surface of the top shield. In some embodiments, the writer pole has at least one sidewall that is inclined from vertical. In some of these embodiments the pedestal also has at least one inclined sidewall.

DETAILED DESCRIPTION

Figure 1:
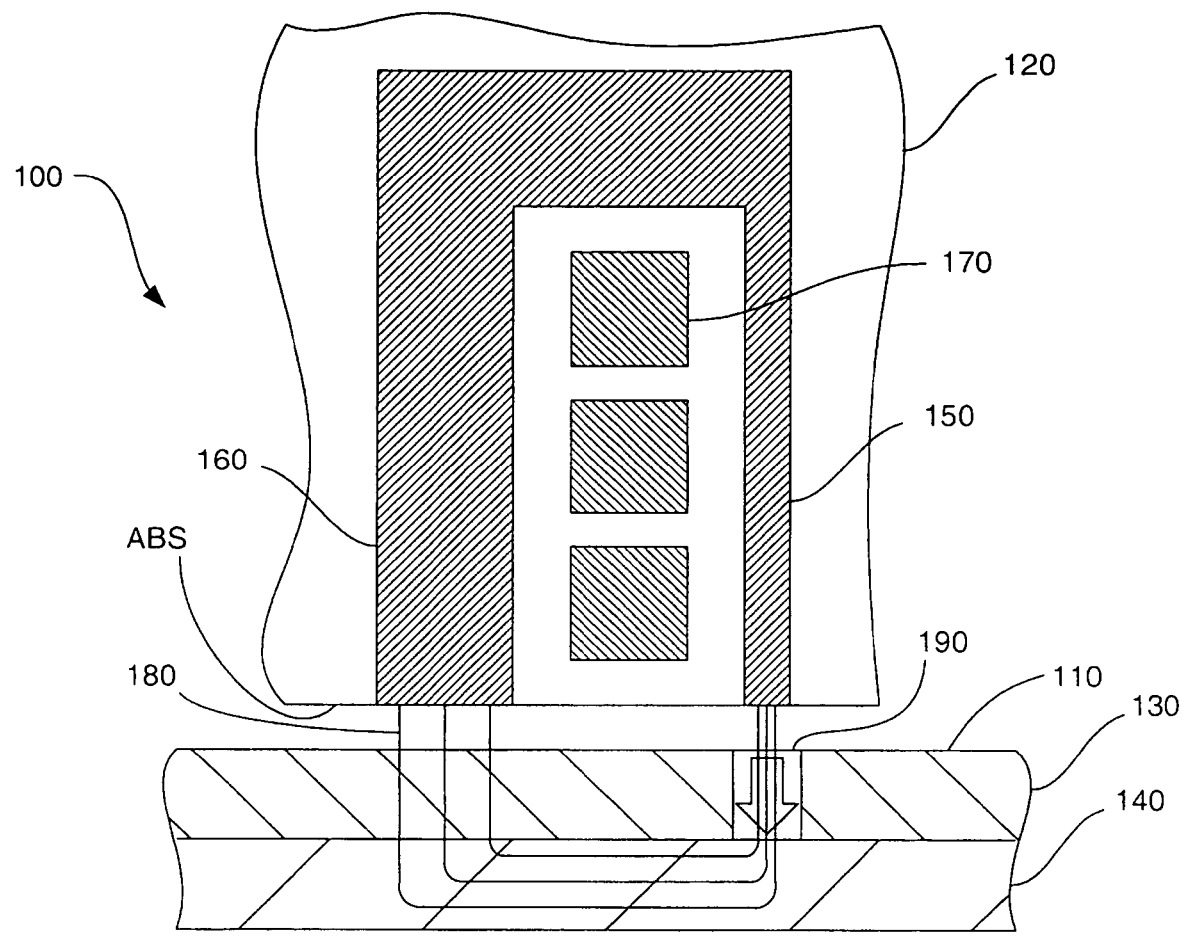
FIG. 1 is a cross-sectional view of a perpendicular recording system according to the prior art.
Figure 2:
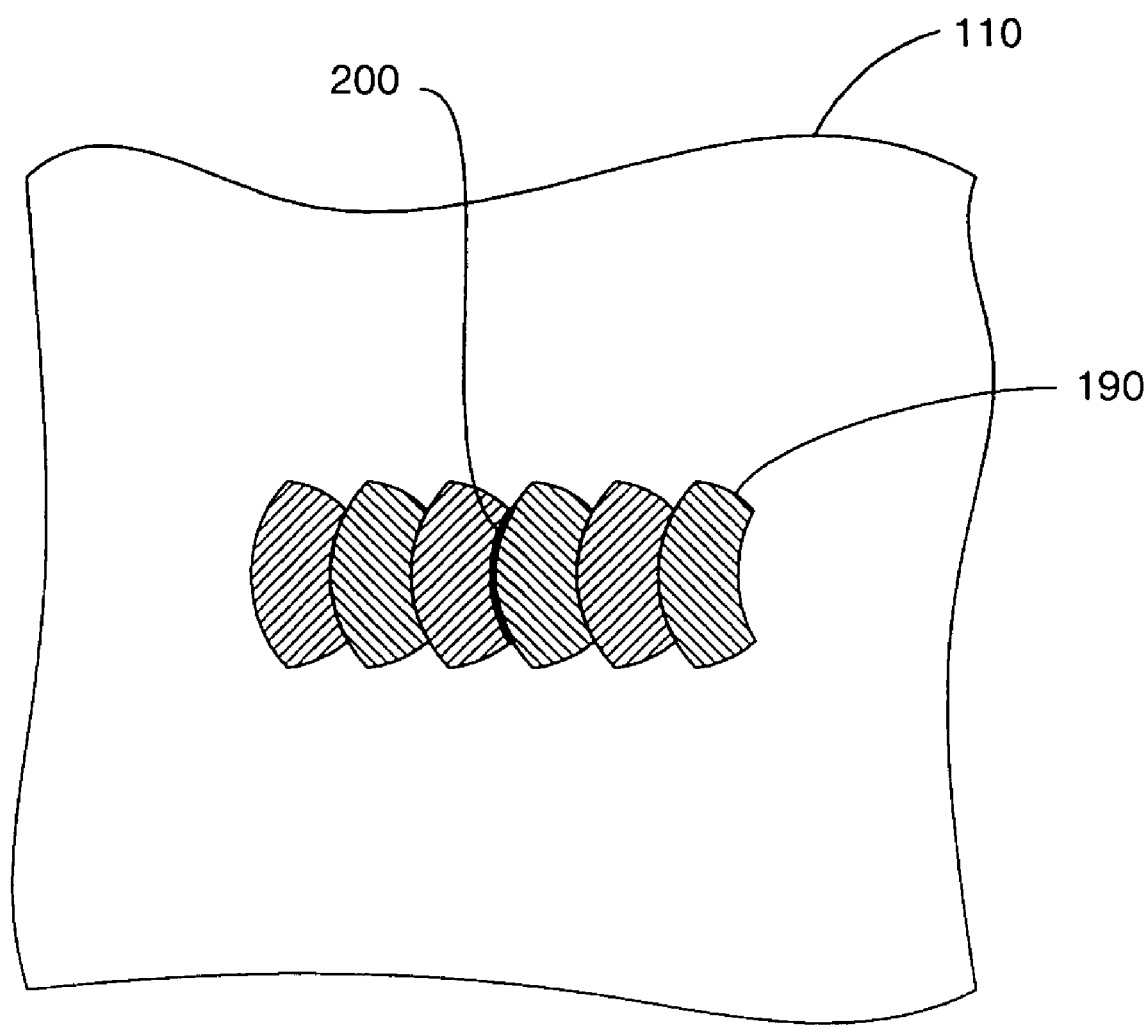
FIG. 2 is a top view of a portion of a magnetic recording disk showing a series of magnetic bits written according to the prior art.
Figure 3:
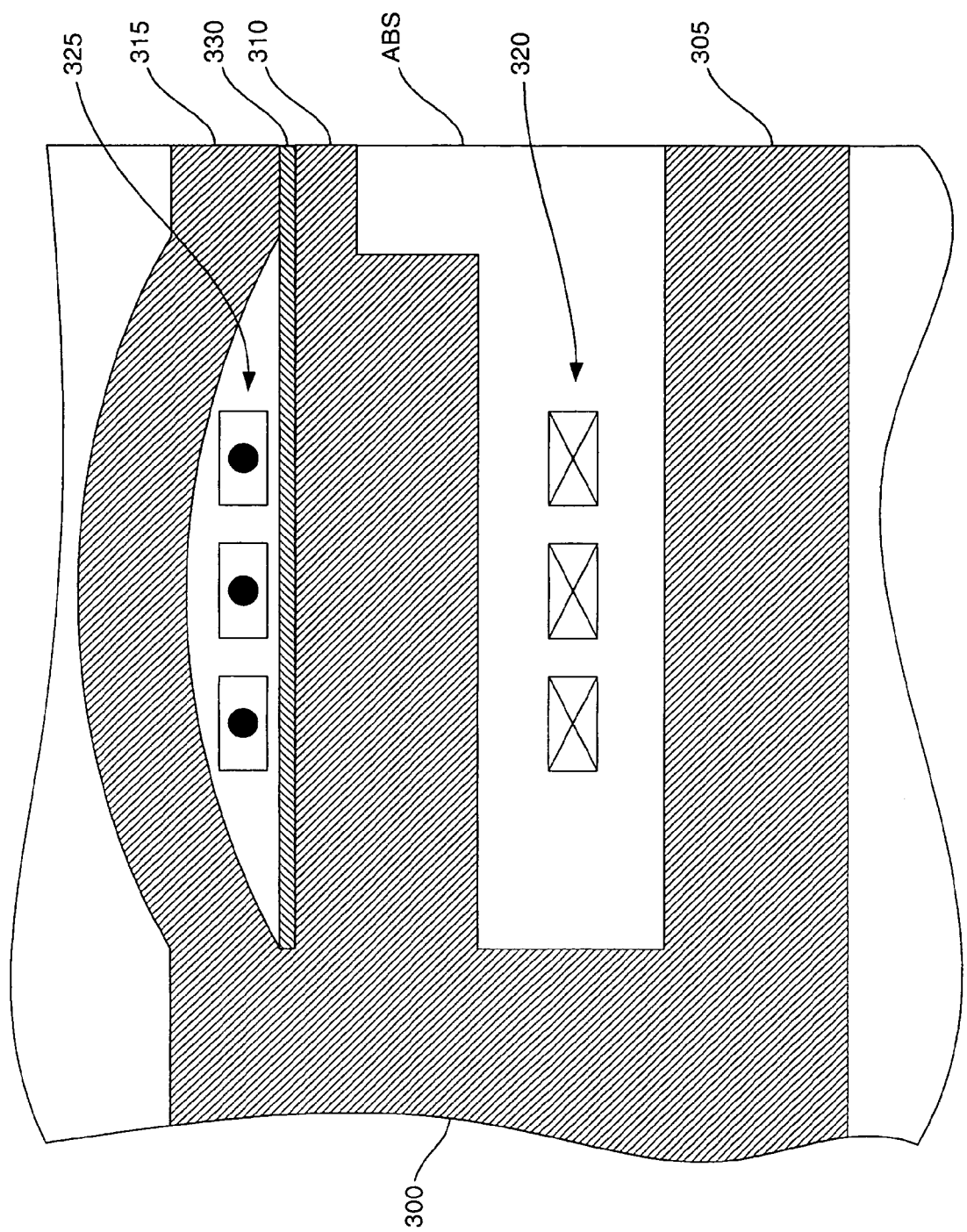
FIG. 3 is a cross-sectional view of an exemplary perpendicular recording head of the present invention.

FIG. 3 shows a cross-sectional view of an exemplary perpendicular recording head 300. The perpendicular recording head 300 comprises a bottom pole 305, a writer pole 310, and a top shield 315. In this example, writing is performed by the writer pole 310, and accordingly, the writer pole 310 is narrow where it is exposed at the ABS so that the magnetic flux density is highest in the vicinity of the writer pole 310. In some embodiments, the writer pole 310 comprises two layers, a lower layer of a high moment magnetic material and an upper layer, sometimes referred to as a hot seed layer, made of a magnetic material with a higher magnetic moment than the lower layer. In these embodiments only the upper layer is exposed at the ABS.

The bottom and writer poles 305 and 310 are joined together to form a first yoke. The first yoke includes coil windings 320 disposed between the bottom and writer poles 305 and 310. The writer pole 310 and the top shield 315 are also joined together to form a second yoke, and the second yoke also includes coil windings 325 disposed between the writer pole 310 and the top shield 315. Additionally, the second yoke includes a gap layer 330 disposed between the writer pole 310 and the top shield 315 in the vicinity of the ABS. In some embodiments, as shown in FIG. 3, the gap layer 330 extends back from the ABS and between the writer pole 310 and the coil windings 325. The overall arrangement illustrated in FIG. 3 is common to the particular embodiments that will be discussed below with respect to FIGS. 4-10. It will be appreciated that although the perpendicular recording head 300 includes the first yoke, the first yoke is not essential. Some perpendicular recording heads of the invention employ only the second yoke and do not include bottom pole 305 nor coil windings 320.

The two coil windings 320 and 325 of the two yokes are arranged such that when an electric current passes through one coil winding in one orientation, an equal electrical current passes through the other coil winding in the opposite orientation. In FIG. 3, to show that current is flowing in opposite directions in the two coil windings 320 and 325, each of the coil windings 320 is labeled with an "X" and each of the coil windings 325 is labeled with black circle. In some embodiments, the perpendicular recording head 300 has double-reversed pancake coils to achieve this arrangement.

Because current flows in opposite directions in the two coil windings 320 and 325, the magnetic fields that are induced in the two yokes circulate in opposite directions. Thus, while the magnetic field in one yoke circulates in a clockwise direction, the magnetic field in the other yoke circulates in a counter-clockwise direction. As a result of this arrangement, the magnetic fields from both yokes are always oriented in the same direction within the writer pole 310 to form a combined magnetic field therein. The orientation of this combined magnetic field is reversed by reversing the direction of the current flowing through the two coil windings 320 and 325. In this way the perpendicular recording head 300 is able to write perpendicular data bits with either an up or a down orientation relative to the plane of the magnetic recording disk. It will be understood that in those embodiments that do not include the first yoke the principle of operation is essentially the same, but with only one circulating magnetic field.

Figure 4:
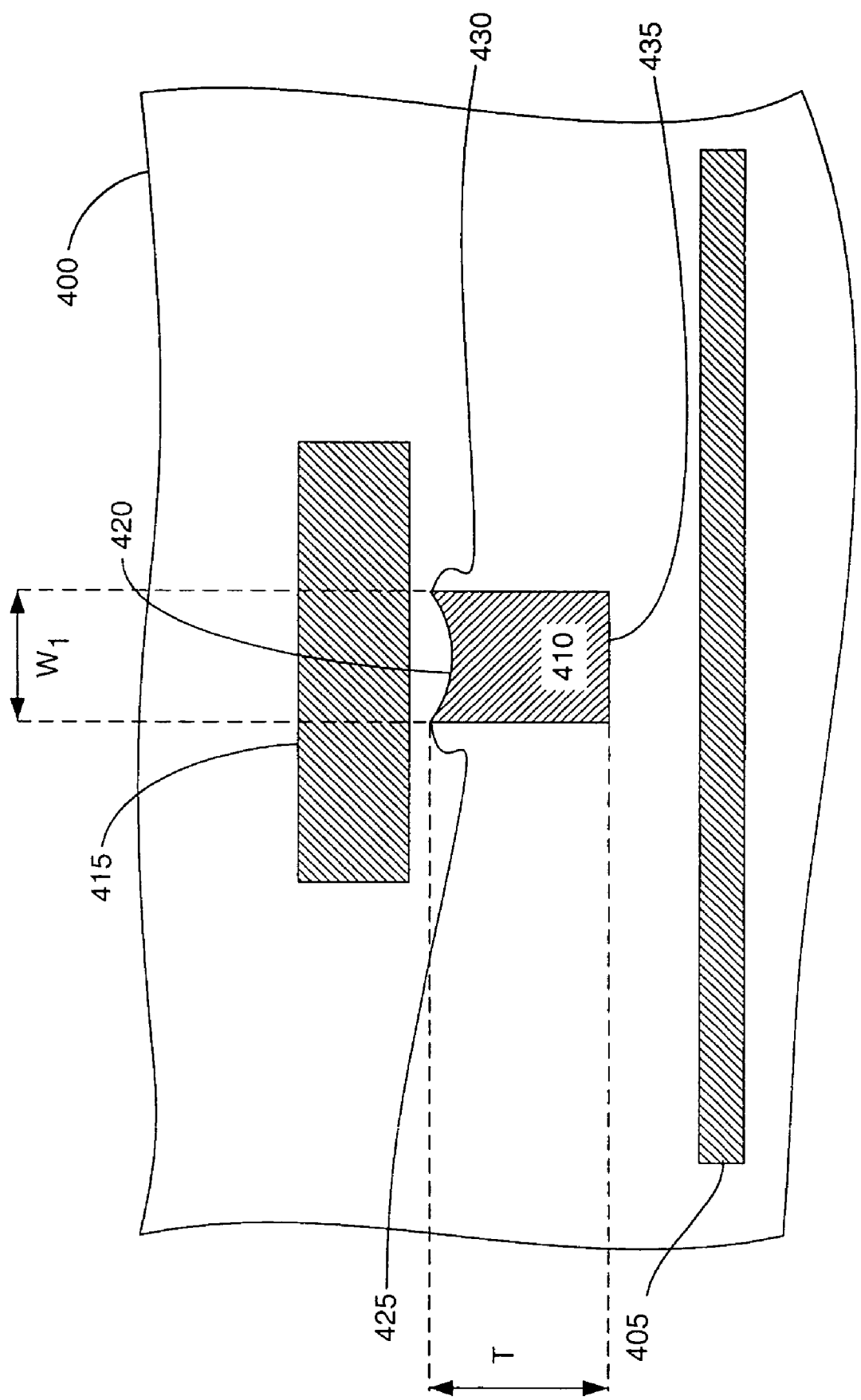
FIGS. 4-9 are ABS views of exemplary embodiments of perpendicular recording heads according to the present invention.

FIG. 4 shows an ABS view of an exemplary embodiment of a perpendicular recording head 400. The perpendicular recording head 400 comprises a bottom pole 405, a writer pole 410, and a top shield 415. Although the embodiment illustrated in FIG. 4 includes the bottom pole 405, some embodiments do not include bottom pole 405. In this embodiment the writer pole 410 includes a facing surface 420 that faces the top shield 415 and is proximate thereto. As can be seen from FIG. 4, the facing surface 420 is concave as viewed from the perspective of the top shield 415. As shown in FIG. 4, the writer pole 410 has a top width, $W_1$, measured between edges 425, 430 of the facing surface 420, and a thickness, T, measured from a bottom surface 435 of the writer pole 420 to either edge 425, 430. In some embodiments, the thickness, T, of the writer pole 420 is about equal to the top width, $W_1$. Also in some embodiments, a ratio of the thickness, T, to the top width, $W_1$, is more than 1.5. An exemplary value for the top width, $W_1$, is about 0.14 µm, and an exemplary value for the thickness, T, is about 0.28 µm.

Figure 5:
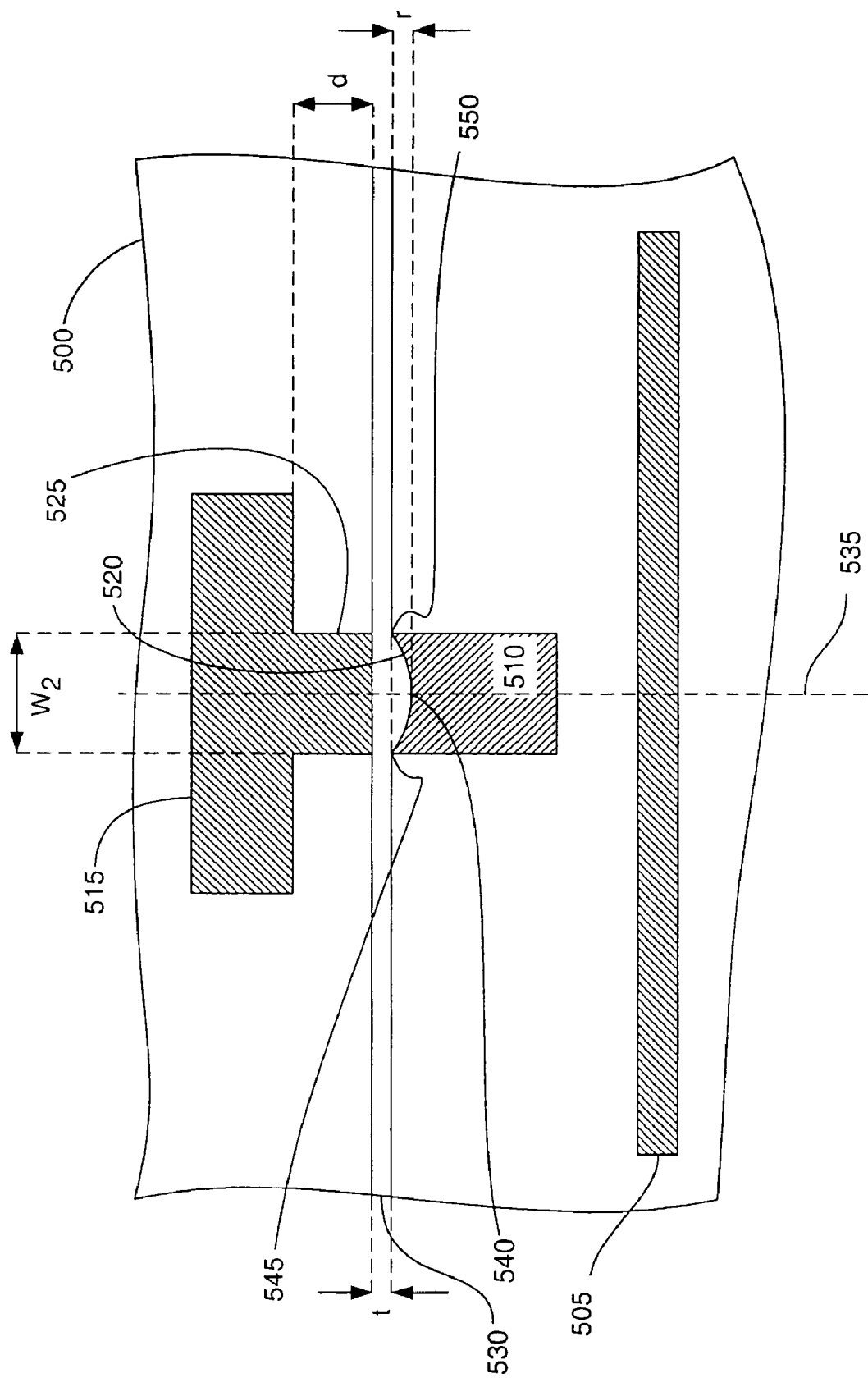

FIG. 5 shows an ABS view of an exemplary embodiment of another perpendicular recording head 500. The perpendicular recording head 500 comprises a bottom pole 505, a writer pole 510 including a concave facing surface 520, and a top shield 515. Although the embodiment illustrated in FIG. 5 includes the bottom pole 505, some embodiments do not include bottom pole 505. In this embodiment the top shield 515 includes a pedestal 525. It can be seen that the pedestal 525 protrudes towards the writer pole 510 and is separated from the writer pole 510 by a gap layer 530. In some embodiments, the gap layer 530 has a thickness, t, that varies from an average gap layer thickness by at not more than 30%. Also in some embodiments, the thickness, t, of the gap layer 530 is between about 100 Å to about 1000 Å.

The following relationships and values work well for the present invention. For example, a width, $W_2$, of the pedestal 525 is about equal to the top width, $W_1$, of the writer pole 510 in some embodiments. Also in some embodiments, a depth, d, of the pedestal 525 is greater than the thickness, t, of the gap layer 530. The depth, d, of the pedestal 525 can be between about 100 Å to about 5000 Å.

The writer pole 510 includes a recessed depth, r. The recessed depth, r, is measured along a vertical axis 535 of the writer pole 510 from a bottom 540 of the facing surface 520 to a line between the edges 545, 550 of the facing surface 520. In some embodiments, the recessed depth, r, is at least 5 nm. Also in some embodiments, a ratio of the recessed depth, r, to the top width, $W_1$, of the writer pole 520 is between about 0.05 to about 0.25. In further embodiments, a ratio of the recessed depth, r, to a maximum thickness of the gap layer 530 measured between the writer pole 510 and the top shield 515 is greater than about 1.

Figure 6:
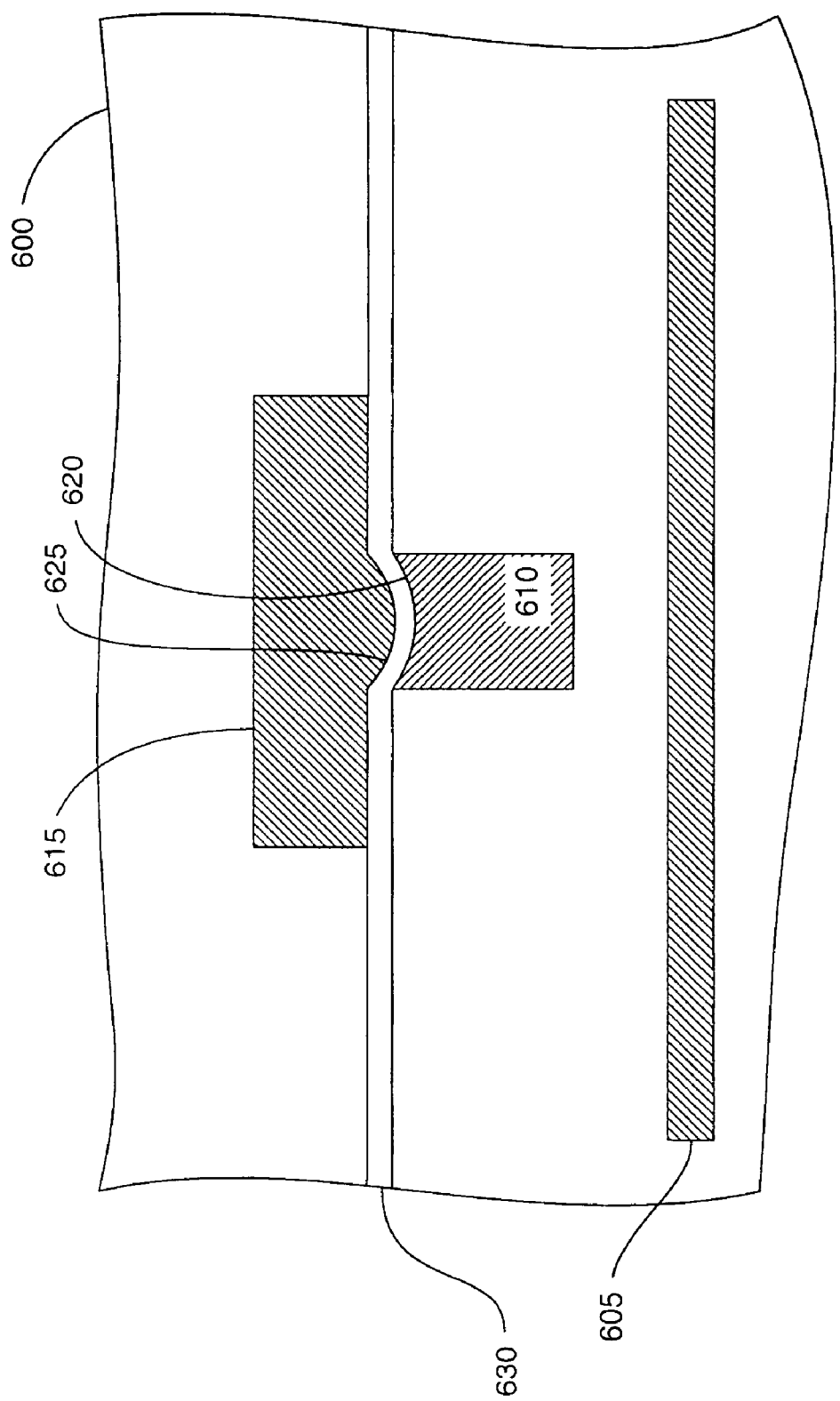

FIG. 6 shows an ABS view of an exemplary embodiment of still another perpendicular recording head 600. The perpendicular recording head 600 comprises a bottom pole 605, a writer pole 610 including a concave facing surface 620, and a top shield 615 including a convex surface 625 that faces the writer pole 610 and is proximate thereto. It can be seen that the convex surface 625 is convex as viewed from the perspective of the writer pole 610. A gap layer 630 is disposed between the writer pole 610 and the top shield 615. Although the embodiment illustrated in FIG. 6 includes the bottom pole 605, some embodiments do not include bottom pole 605.

In some embodiments, the concave facing surface 620 and the convex surface 625 have the same shape, for example, each describes a circular arc with the same radius of curvature. In these embodiments the gap layer 630, between the concave facing surface 620 and the convex surface 625, has a generally uniform thickness and the same curved shape as the concave facing surface 620 and the convex surface 625. In some embodiments a radius of curvature of the gap layer 630 is less than 3 times the top width, $W_1$ (FIG. 4), of the writer pole 610. Also in some embodiments, the gap layer 630 has a radius of curvature that is less than 4.5 times the thickness, t (FIG. 5). It will be appreciated that although the gap layer 630 has been shown as curved, with a shape that follows a circular arc, the gap layer 630 is not limited to circular arcs nor smoothly varying curves. For example, the gap layer 630 can include a number of straight segments that together approximate a curve.

Figure 7:
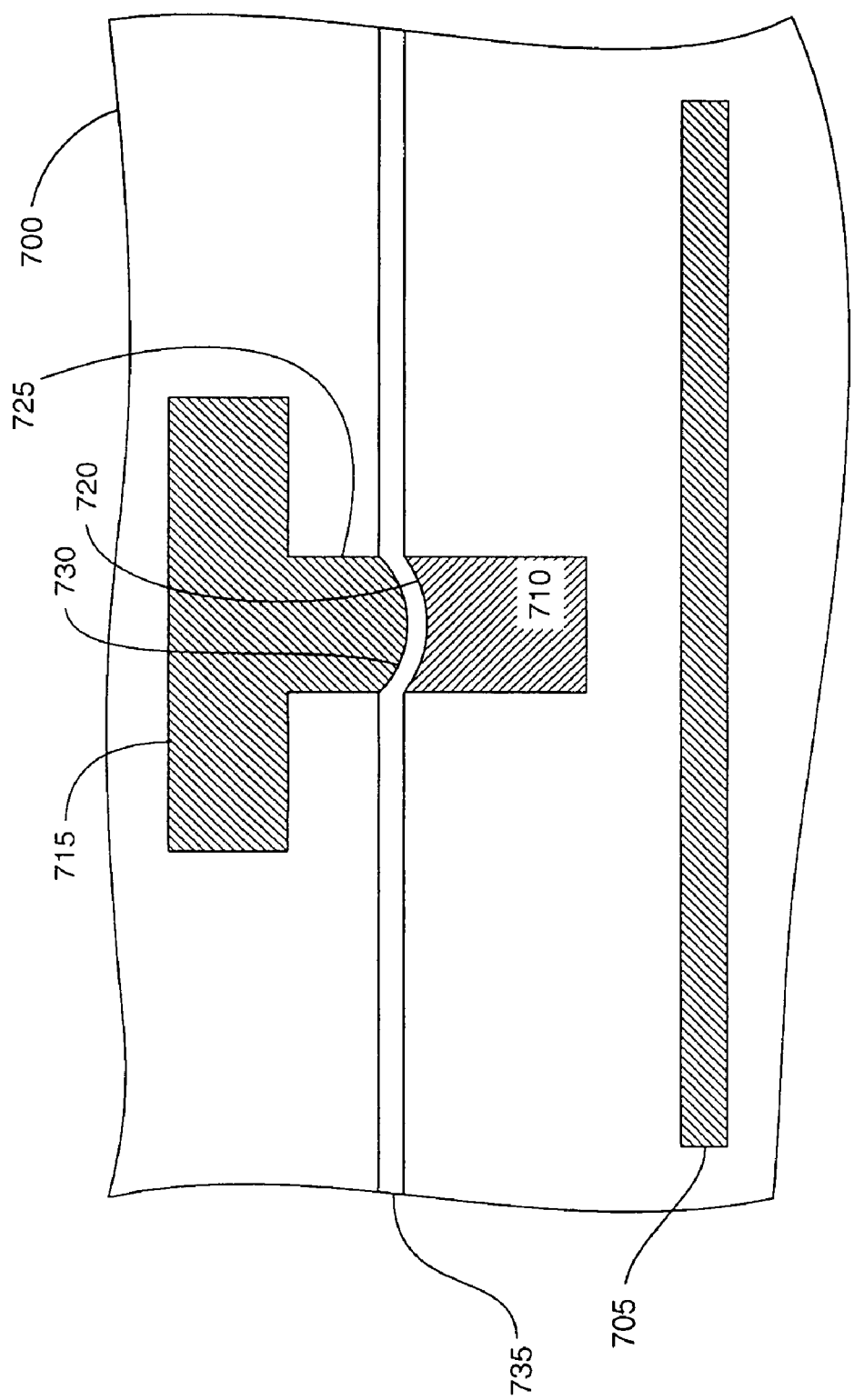

FIG. 7 shows an ABS view of an exemplary embodiment of still another perpendicular recording head 700. The perpendicular recording head 700 comprises a bottom pole 705, a writer pole 710 including a concave facing surface 720, and a top shield 715. Although the embodiment illustrated in FIG. 7 includes the bottom pole 705, some embodiments do not include bottom pole 705. In this embodiment the top shield 715 includes a pedestal 725 that has a convex bottom surface 730 that faces the writer pole 710 and is proximate thereto. A gap layer 735 is disposed between the writer pole 710 and the top shield 715. In embodiments both with a pedestal 725 and without, such as those illustrated by FIG. 6, the gap layer 630, 735 has a thickness that varies from an average gap layer thickness by less than 30%.

Figure 8:
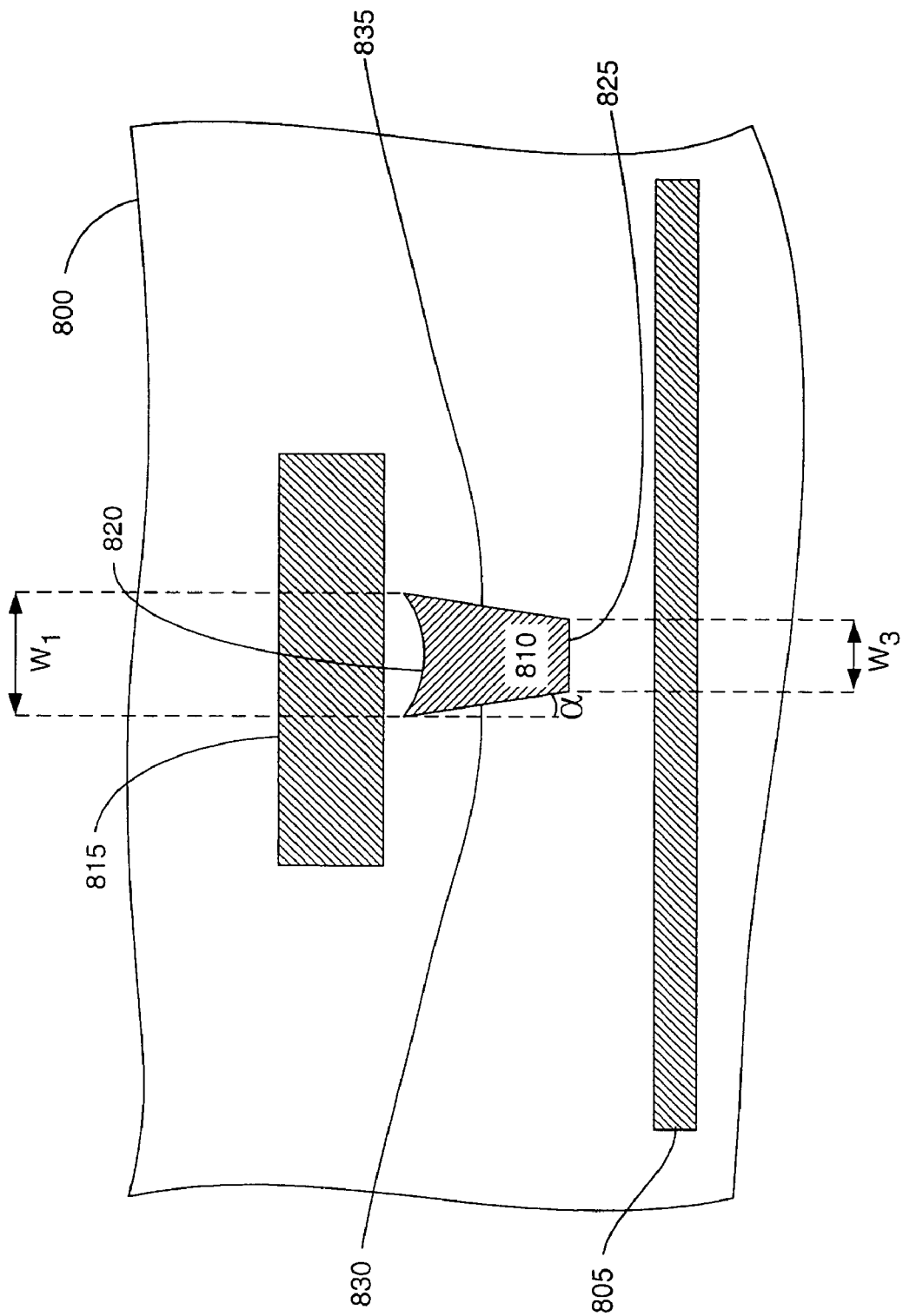

FIG. 8 shows an ABS view of an exemplary embodiment of yet another perpendicular recording head 800. The perpendicular recording head 800 comprises a bottom pole 805, a writer pole 810 including a concave facing surface 820, and a top shield 815. Although the embodiment illustrated in FIG. 8 includes the bottom pole 805, some embodiments do not include bottom pole 805. Additional embodiments include a pedestal, such as pedestal 725 (FIG. 7) with a convex bottom surface 730, or a pedestal 525 (FIG. 5) without a convex surface. Further embodiments have a top shield 815 including a convex surface, such as convex surface 625 (FIG. 6), but without a pedestal. The writer pole 810 has a top width, $W_1$, that is greater than a bottom width, $W_3$, that is measured across a bottom surface 825. Because of the difference between the widths $W_1$ and $W_3$ a writer pole sidewall 830 or 835 of the writer pole 810 is inclined by an inclination angle, α, from vertical. As shown in FIG. 8, in some embodiments both writer pole sidewalls 830 and 835 are inclined by the same inclination angle. In some embodiments the inclination angle is in the range 0° to 15°. An exemplary inclination angle, α, is about 7°.

Figure 9:
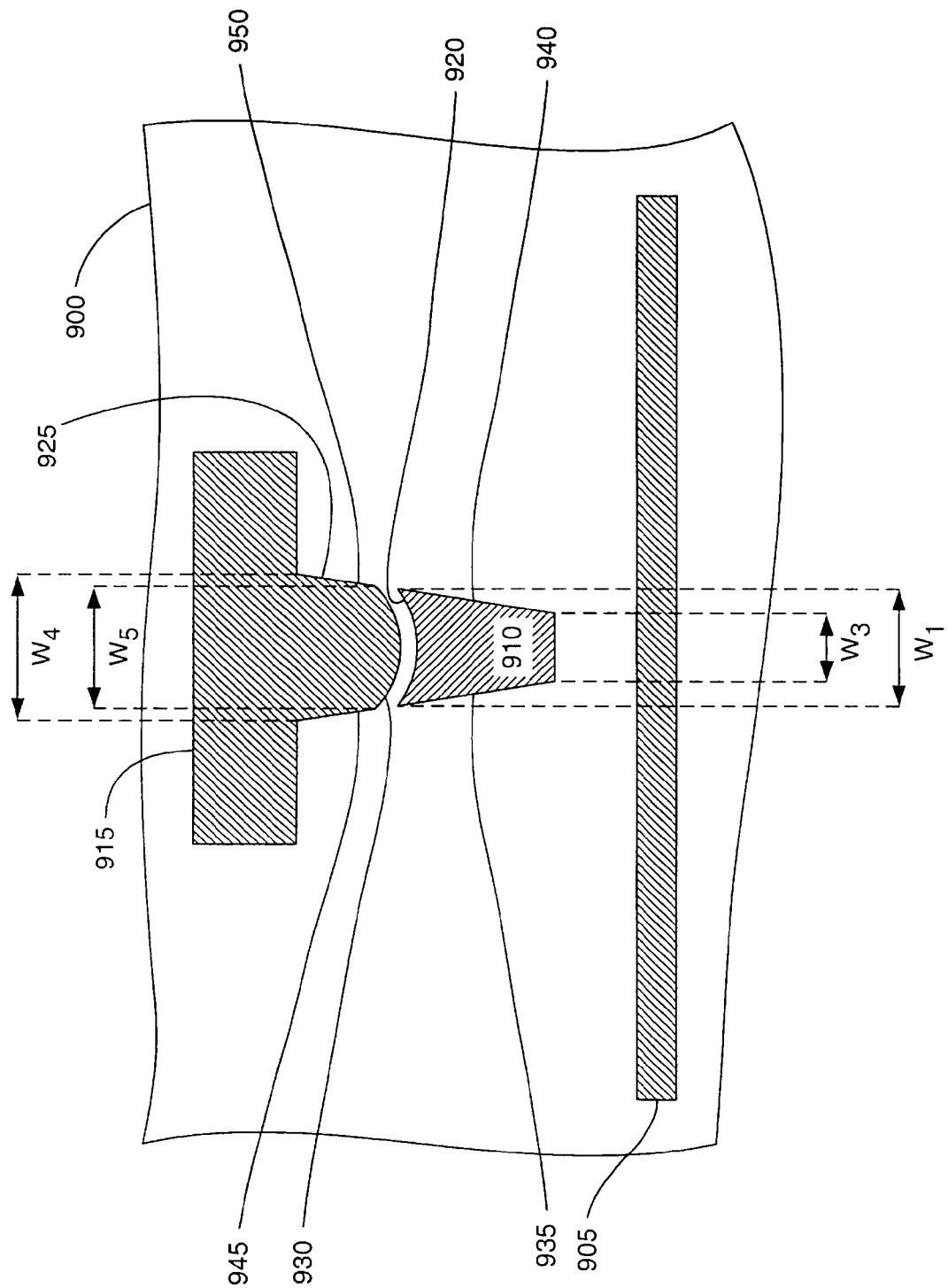

FIG. 9 shows an ABS view of an exemplary embodiment of yet another perpendicular recording head 900. The perpendicular recording head 900 comprises a bottom pole 905, a writer pole 910 including a concave facing surface 920, and a top shield 915 including a pedestal 925. In some embodiments the pedestal 925 has a convex surface 930 as shown in FIG. 9. As above, some embodiments do not include bottom pole 905. The writer pole 910 has a top width, $W_1$, that is greater than a bottom width, $W_3$, and at least one writer pole sidewall 935 or 940 is inclined from vertical. The pedestal 925 also has a top pedestal width, $W_4$, that is greater than a bottom pedestal width, $W_5$. Accordingly, at least one pedestal sidewall 945 or 950 is inclined from vertical. In some embodiments, as shown in FIG. 9, sidewalls 935 and 945 are collinear, as are sidewalls 940 and 950.

Figure 10:
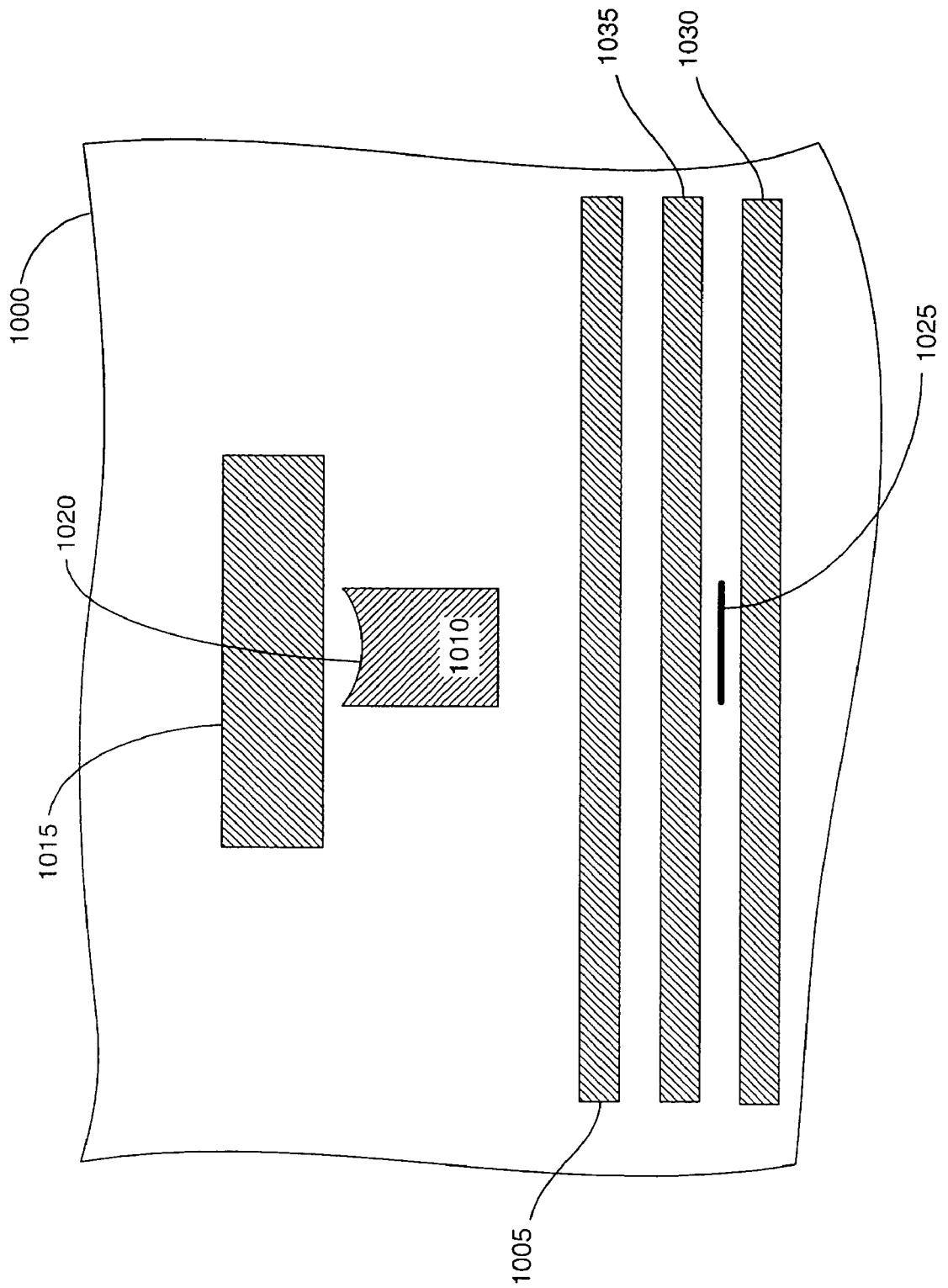
FIG. 10 is an ABS view of an exemplary read/write head according to the present invention.

FIG. 10 shows an ABS view of an exemplary embodiment of a read/write head 1000 including a perpendicular recording head. The perpendicular recording head of the read/write head 1000 comprises a bottom pole 1005, a writer pole 1010 including a concave facing surface 1020, and a top shield 1015. As above, some embodiments of the read/write head of the invention do not include bottom pole 1005. The read/write head 1000 also comprises a read element 1025 disposed below the bottom pole 1005. In some embodiments the read element 1025 is a magnetoresistive (MR) sensor. The read/write head 1000 can also comprise a first shield 1030 below the read element 1025 and a second shield 1035 between the read element 1025 and the bottom pole 1005.

FIGS. 11-18 illustrate an exemplary method for making an embodiment of a perpendicular recording head of the invention. Each of FIGS. 11-18 show a cross-sectional view of a partially fabricated perpendicular recording head of the invention, where the section in each is taken along a plane that will become the ABS upon completion of the fabrication process. For convenience, this view will be referred to as the ABS view and represents the same perspective as the ABS view in FIGS. 4-10.

Figure 11:
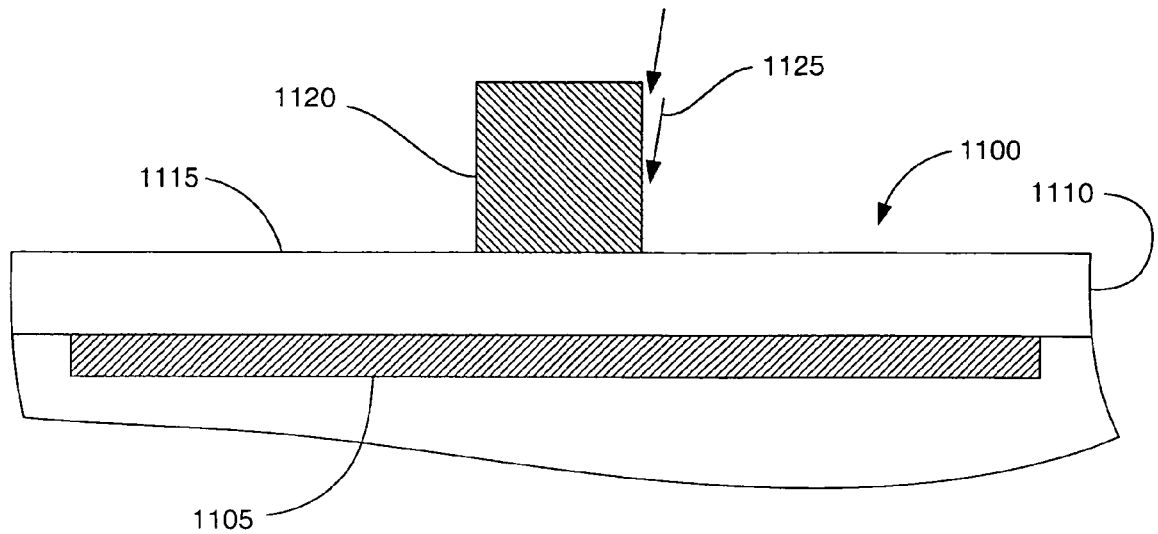
FIGS. 11-18 are ABS views of a partially fabricated perpendicular recording head at successive steps of an exemplary manufacturing method of the present invention.

FIG. 11 shows an ABS view of a partially fabricated perpendicular recording head including a substrate 1100. The substrate 1100 comprises a bottom pole 1105 that is made from a high magnetic moment material that can support a magnetic field with a high flux density before becoming saturated (unable to support a higher flux density). The bottom pole 1105 can be fabricated, for example, by well known masking and plating techniques. It will be appreciated that the method illustrated by FIGS. 11-18 can also be used to fabricate a read/write head of the invention, such as read/write head 1000 (FIG. 10), and in these embodiments the read element 1025 (FIG. 10) and the bottom shield 1030 (FIG. 10) are also fabricated as part of the substrate 1100 according to well known techniques. It will also be appreciated that the substrate can be fabricated without the bottom pole 1105.

The substrate 1100 also comprises a first insulation layer 1110 disposed above the bottom pole 1105. The first insulation layer 1110 is made of an electrically insulating material such as $Al_2O_3$, for example, by a sputtering process. A top surface 1115 of the first insulation layer 1110 is planarized, for instance, by chemical mechanical polishing (CMP) to provide a very flat surface upon which to form a writer pole precursor 1120. The writer pole precursor 1120 is also made from a high magnetic moment material, for example, by plating. At the point of the process that is shown in FIG. 11, any masking materials used to plate the writer pole precursor 1120 have been removed so that the writer pole precursor 1120 is free-standing.

With reference to FIG. 3, it will be understood that in some embodiments the writer pole 310 (FIG. 3) comprises a lower layer and an upper layer. In these embodiments, the lower layer cannot be seen in the ABS view of FIG. 11 as the lower layer is not exposed at the ABS. In these embodiments the lower layer is formed as a layer of the substrate 1100 and the writer pole precursor 1120 is only used to form the upper layer of the writer pole 310. Accordingly, the lower layer is exposed at the top surface 1115 when the first insulation layer 1110 is planarized. Also, in these embodiments, the writer pole precursor 1120 is made from a magnetic moment material with a higher magnetic moment than the lower layer.

Figure 12:
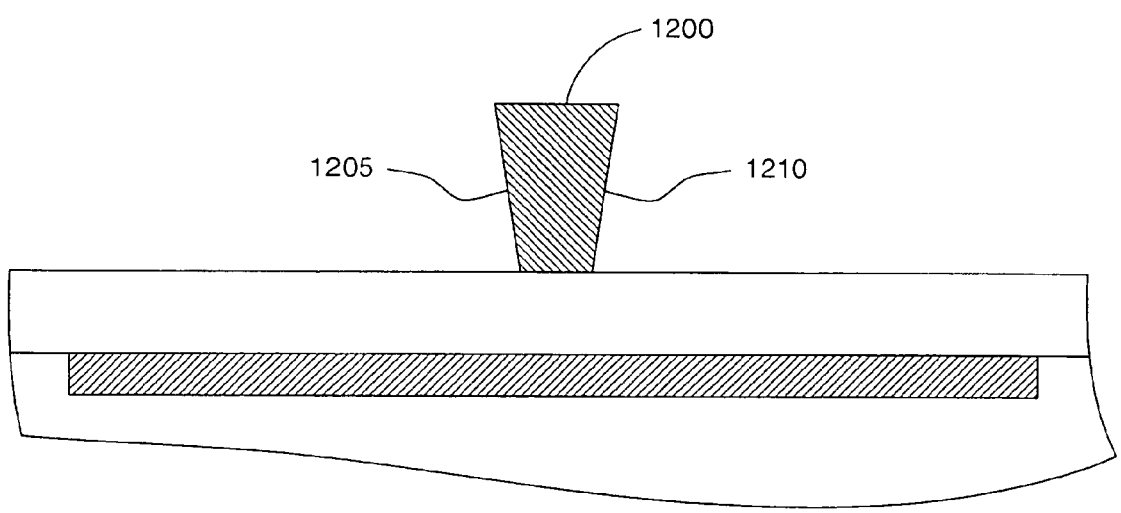

FIG. 12 shows the ABS view of the partially fabricated perpendicular recording head after the writer pole precursor 1120 has been trimmed to produce a writer pole 1200 with sidewalls 1205 and 1210. Trimming can be performed, for example, by ion beam milling with the partially fabricated perpendicular recording head fixed at an angle to an ion beam 1125 (FIG. 11) to achieve the desired inclination angle. First one side of the writer pole precursor 1120 is trimmed, and then the other.

Figure 13:
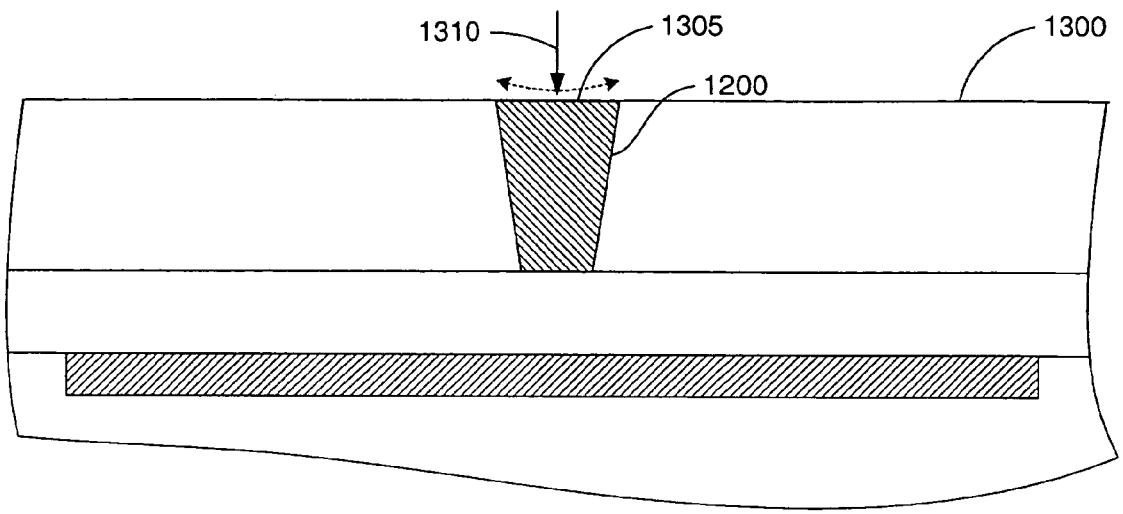
Figure 14:
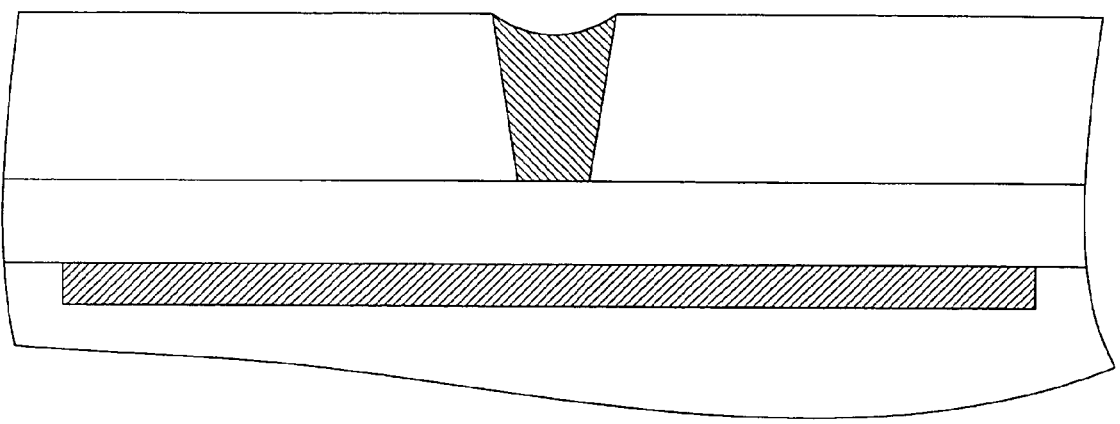

FIG. 13 shows the partially fabricated perpendicular recording head after a writer insulation layer 1300 has been deposited on both sides of the writer pole 1200. The deposition can be achieved, for instance, by sputtering a material such as $Al_2O_3$ followed by a planarization, such as by CMP. Also shown in FIG. 13 is one alternative process for forming a recess, such as recess 420 (FIG. 4) in the writer pole 1200. In this process a focused ion beam 1310 is scanned repeatedly across a top surface 1305 of the writer pole 1200. The focused ion beam 1310 is scanned with oscillations that progressively decrease in amplitude to mill the center more than the sides of the top surface 1305 to produce the desired shape shown in FIG. 14. It will be appreciated that shaping the top surface 1305 need only occur on a portion of the writer pole 1200 that is proximate to the ABS.

Another method for forming the recess in the writer pole 1200 is described in U.S. Patent Application Publication 2004/0156142 A1 in the name of Mochizuki et al., incorporated by reference herein in its entirety. Mochizuki et al. teaches the use of ion milling, reactive ion etching, or an acid treatment to take advantage of differences in the grain structure of the writer pole 1200 that vary from center to edge. Due to these differences, differential material removal rates can be obtained with these processes to selectively remove more material at the center than at the edges. Mochizuki et al. also notes that under certain conditions CMP will inherently polish the writer pole 1200 faster than the surrounding second insulation layer 1300 to achieve the same result.

Figure 15:
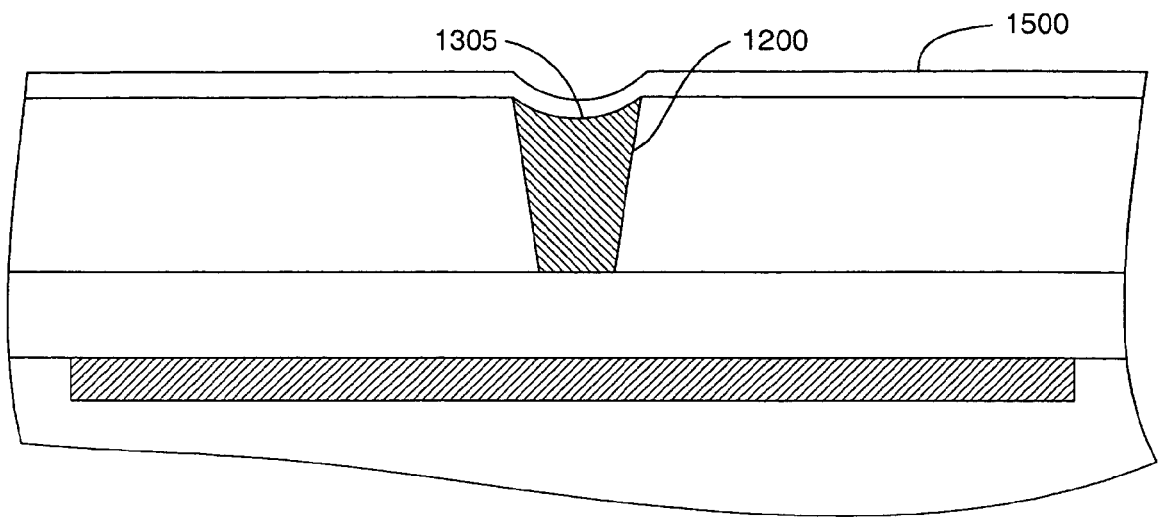

FIG. 15 shows the partially fabricated perpendicular recording head after a gap layer 1500 has been formed. The gap layer 1500 can be formed, for example, by sputtering $Al_2O_3$. In FIG. 15 the gap layer 1500 is very thin so that the gap layer conforms to the shape of the top surface 1305 of the writer pole 1200. To make a perpendicular recording head, such as perpendicular recording head 400, in which the gap layer has a flat top surface, the gap layer 1500 can be deposited as a thicker layer and then planarized.

Figure 16:
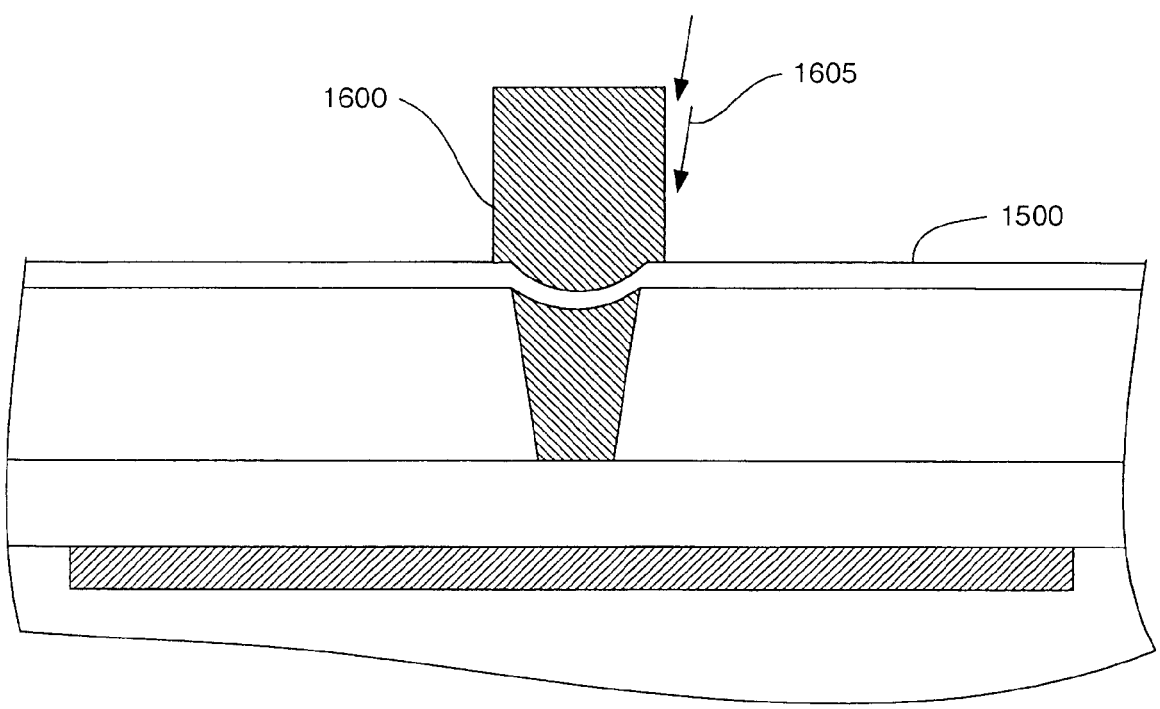

As shown in FIG. 16, a pedestal precursor 1600 is formed on top of the gap layer 1500. The pedestal precursor 1600 is also made from a high magnetic moment material, for example, by plating. At the point of the process that is shown in FIG. 16, any masking materials used to plate the pedestal precursor 1600 have been removed so that the pedestal precursor 1600 is free-standing. To make embodiments of the perpendicular recording head that do not include a pedestal, a top shield layer is instead formed in place of the pedestal precursor 1600 at this point.

Figure 17:
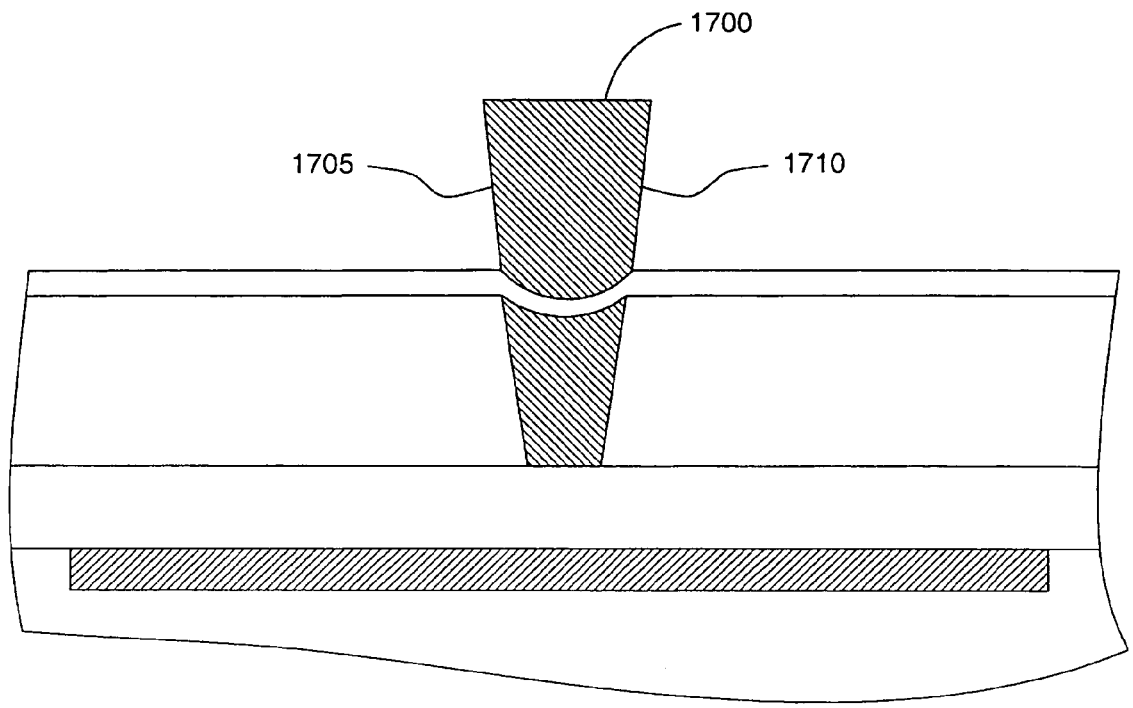

FIG. 17 shows the ABS view of the partially fabricated perpendicular recording head after the pedestal precursor 1600 has been trimmed to produce a pedestal 1700 with sidewalls 1705 and 1710. Trimming can be performed, for example, by ion beam milling with the partially fabricated perpendicular recording head fixed at an angle to an ion beam 1605 (FIG. 16) to achieve the desired inclination angle. First one side of the pedestal precursor 1600 is trimmed, and then the other.

Figure 18:
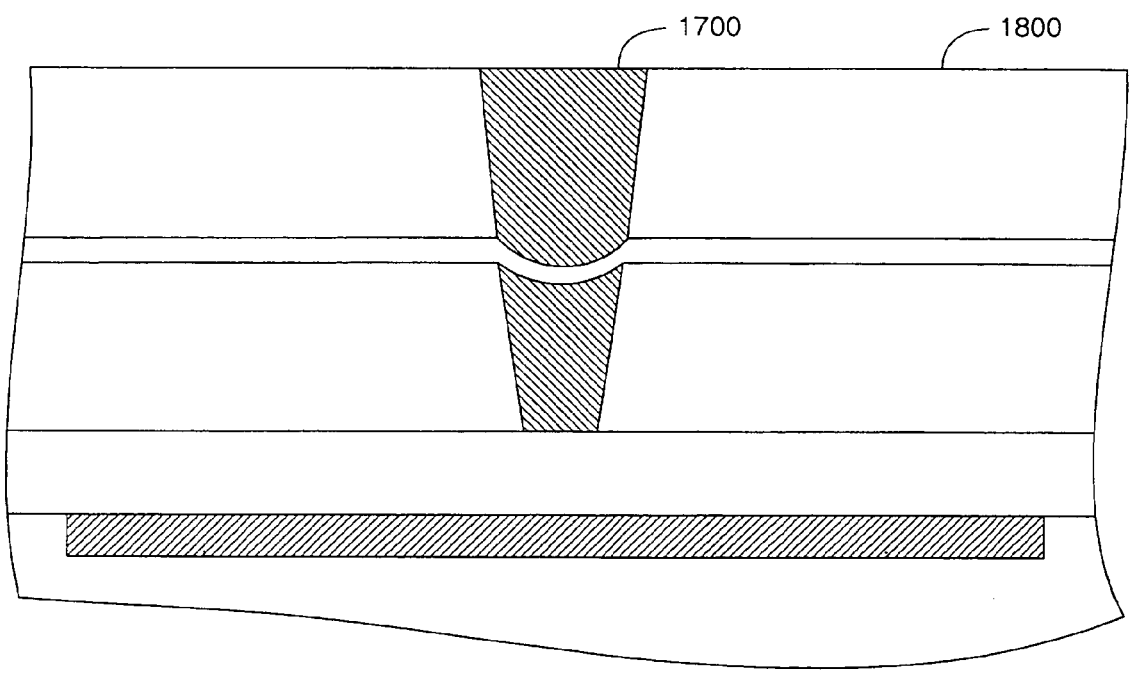

FIG. 18 shows the partially fabricated perpendicular recording head after a third insulation layer 1800 has been deposited on both sides of the pedestal 1700. The deposition can be achieved, for instance, by sputtering a material such as $Al_2O_3$ followed by a planarization, such as by CMP to produce a planar surface on which to form a top shield layer (not shown). Formation of the top shield layer can be achieved, for example, by plating a high moment magnetic material.

In the foregoing specification, the present invention is described with reference to specific embodiments thereof, but those skilled in the art will recognize that the present invention is not limited thereto. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A perpendicular recording head comprising:
   a writer pole; and
   a top shield disposed above the writer pole and magnetically coupled thereto and including a convex surface that faces the writer pole and is proximate thereto, the convex surface being convex as viewed from the writer pole;
   a gap layer;
   the writer pole including a width and a facing surface that faces the top shield and is proximate thereto, the facing surface being concave as viewed from the top shield, a portion of the gap layer residing between the facing surface and the top shield, wherein the writer pole includes a recessed depth measured along a vertical axis of the writer pole from a bottom of the facing surface to a line between the edges of the facing surface, and a ratio of the recessed depth to a maximum thickness of the gap layer between the writer pole and the top shield is greater than about 1; and
   wherein the portion of the gap layer has a radius of curvature that is less than three times the width of the writer pole;
   wherein the convex surface includes a first edge and a second edge and wherein the top shield further includes a first shield surface, a second shield surface, and a pedestal between the first shield surface and the second shield surface, the first and second shield surfaces being substantially perpendicular to the vertical axis of the writer pole, the pedestal including the convex surface, a first pedestal surface adjoining the convex surface at the first edge and a second pedestal surface adjoining the convex surface at the second edge, the first pedestal surface residing between the convex surface and the first shield surface, the second pedestal surface residing between the convex surface and the second shield surface, the first pedestal surface extending from the first shield surface toward the writer pole, and the second pedestal surface extending from the second shield surface toward the writer pole, wherein the first pedestal surface and the second pedestal surface are parallel to the vertical axis of the writer pole.

2. The perpendicular recording head of claim 1 further comprising a bottom pole disposed below the writer pole and magnetically coupled thereto.

3. The perpendicular recording head of claim 1 wherein the writer pole includes a side distal to the top shield, the perpendicular recording head further comprising:
   at least one coil including a plurality of windings configured to pass current in a first direction between the top shield and the writer pole and in a second direction opposite to the first direction in proximity to the side of the writer pole distal to the top shield.

4. The perpendicular recording head of claim 1 wherein the pedestal of the top shield protrudes towards the writer pole and is separated therefrom by the gap layer, wherein a bottom surface of the pedestal includes the convex surface of the top shield.

5. The perpendicular recording head of claim 1 or 4 wherein the gap layer has a thickness that varies from an average gap layer thickness by less than 30%.

6. The perpendicular recording head of claim 4 wherein the gap layer has a thickness that varies from an average gap layer thickness by not more than 30%.

7. The perpendicular recording head of claim 4 wherein a thickness of the gap layer is between about 100 Å to about 1000 Å.

8. The perpendicular recording head of claim 4 wherein a width of the pedestal is about equal to a top width of the writer pole.

9. The perpendicular recording head of claim 4 wherein a depth of the pedestal is greater than a thickness of the gap layer.

10. The perpendicular recording head of claim 4 wherein a depth of the pedestal is between about 100 Å to about 5000 Å.

11. The perpendicular recording head of claim 4 wherein the recessed depth is at least 5 nm.

12. The perpendicular recording head of claim 4 wherein a ratio of the recessed depth to the width of the writer pole is between about 0.05 to about 0.25.

13. A read/write head comprising:
- a bottom pole;
- a writer pole disposed above the bottom pole and magnetically coupled thereto;
- a top shield disposed above the writer pole and magnetically coupled thereto and including a convex surface that faces the writer pole and is proximate thereto, the convex surface being convex as viewed from the writer pole;
- a gap layer;
- the writer pole including a width and a facing surface that faces the top shield and is proximate thereto, the facing surface being concave as viewed from the top shield, a portion of the gap layer residing between the facing surface and the top shield, wherein the writer pole includes a recessed depth measured along a vertical axis of the writer pole from a bottom of the facing surface to a line between the edges of the facing surface, and a ratio of the recessed depth to a maximum thickness of the gap layer between the writer pole and the top shield is greater than about 1; and
- a read element disposed below the bottom pole;
- wherein the portion of the gap layer has a radius of curvature that is less than three times the width of the writer pole;
- wherein the convex surface includes a first edge and a second edge and wherein the top shield further includes a first shield surface, a second shield surface, and a pedestal between the first shield surface and the second shield surface, the first and second shield surfaces being substantially parallel to the bottom pole, the pedestal including the convex surface, a first pedestal surface adjoining the convex surface at the first edge, and a second pedestal surface adjoining the convex surface at the second edge, the first pedestal surface residing between the convex surface and the first shield surface, the second pedestal surface residing between the convex surface and the second shield surface, the first pedestal surface extending from the first shield surface toward the writer pole, and the second pedestal surface extending from the second shield surface toward the writer pole;
- wherein the first pedestal surface and the second pedestal surface are parallel to the vertical axis of the writer pole.

14. The read/write head of claim 13 further comprising a bottom shield below the read element.

15. The read/write head of claim 13 wherein the read element is a MR sensor.

16. The read/write head of claim 13 further comprising:
- at least one coil including a plurality of windings configured to pass current in a first direction between the top shield and the writer pole and in a second direction opposite to the first direction between the writer pole and the bottom pole.

* * * * *